United States Patent

[11] 3,585,591

[72] Inventor Paul Hauff
Constance, Germany
[21] Appl. No. 752,594
[22] Filed Aug. 14, 1968
[45] Patented June 15, 1971
[73] Assignee Telefunken Patentverwertugsgesellschaft m.b.H.
Ulm Donau, Germany
[32] Priority Aug. 24, 1967
[33] Germany
[31] P 15 49 925.9

[54] CIRCUIT ARRANGEMENT FOR DETERMINING THE CORRECT POSITION OF A CHARACTER IN A CHARACTER READER
6 Claims, 3 Drawing Figs.

[52] U.S. Cl. .................................................... 340/146.3
[51] Int. Cl. .................................................... G06k 9/04
[50] Field of Search ........................................ 340/146.3

[56] References Cited

UNITED STATES PATENTS

| | | | |
|---|---|---|---|
| 3,104,371 | 9/1963 | Holt | 340/146.3 |
| 3,179,923 | 4/1965 | Rabinow | 340/146.3 |
| 3,231,860 | 1/1966 | Chatten | 340/146.3 |

*Primary Examiner*—Maynard R. Wilbur
*Assistant Examiner*—Leo H. Boudreau
*Attorney*—Spencer & Kaye

ABSTRACT: An arrangement for determining the instant when a character traversing the scanning field of a character reader is in the proper position to be read including a plurality of memory elements for storing information in binary form relating to the dark and light pattern appearing in the scanning field and signal processing means connected to the memory elements for producing weighted outputs in each half of the scanning field at spaced intervals and arranged to produce a reading signal when the weighted outputs relating to the two halves of the scanning field differ from one another by less than a predetermined amount.

INVENTOR
Paul Hauff

BY Spencer & Kaye
ATTORNEYS

INVENTOR
Paul Hauff
BY Spencer & Kaye
ATTORNEYS

INVENTOR
Paul Hauff

BY Spencer & Kaye
ATTORNEYS

CIRCUIT ARRANGEMENT FOR DETERMINING THE CORRECT POSITION OF A CHARACTER IN A CHARACTER READER

BACKGROUND OF THE INVENTION

The present invention relates to the correct positioning of characters in a character reader and particularly to a circuit arrangement to determine whether a character to be read is correctly positioned in the scanning field of a character reader.

In the design of optical or magnetic devices for character recognition it has proven to be difficult to provide useful criteria for determining the moment when a character is in a correct reading position. In such devices, the characters, in most cases, are moved through a scanning field in the direction of the scanning line and are scanned by a row of electrooptical sensing elements, for example.

In order to permit an accurate recognition of a character to be effected, it is important to perform the evaluation of the character elements presently in the scanning field at that moment when the character is located completely within the scanning field in such a manner that all of the character elements are evaluated simultaneously when at their proper locations.

In order to facilitate the determination of the occurrence of the correct evaluation moment for a character moving through a scanning field, heavily stylized characters have been especially developed for mechanical character recognition. Such characters are provided, at their side which first enters the scanning field, with a perpendicular starting edge having a predetermined position and height. When such characters are being read, the detection of the contents of the scanning field is initiated whenever a starting edge appears at a predetermined point in the scanning field.

Character readers which are to be used for less highly stylized characters must be provided with other, sometimes very expensive, devices to determine the correct reading position of a character.

SUMMARY OF THE INVENTION

It is a primary object of the present invention to overcome these drawbacks and difficulties.

Another object of the invention is to permit the correct position of substantially any style character in the scanning field of a reader to be readily determined.

Still another object of the invention is to eliminate the need for special character elements for permitting the location of the character to be determined.

A more specific object of the invention is to provide a device for the recognition of the correct reading position in a manner substantially independent of the type of script to be read, employing centering criteria which can be applied to any type of script.

Still more specifically, the object of the invention is to provide a device of this type which employs the known "center of black" or, preferably, "center of gravity" technique, disclosed in U.S. Pat. No. 3,104,371 for example, but which does not involve or require any special step for shifting the location of the contents of the character reader in order to bring them into a desired position.

According to the present invention, these and other objects are achieved by the provision of a novel circuit arrangement for determining the correct reading position of a character relative to a reference line in the scanning field of a character reader which senses the contents of its scanning field to produce binary outputs representing the pattern of light and dark elementary areas forming the contents of the scanning field. The circuit arrangement according to the invention essentially includes a plurality of memory elements connected to receive the outputs from the reader and to store these outputs in the form of binary values each corresponding to the content of an elementary scanning field area, adder means connected to the memory elements for summing the number of occurrences of one binary value in the group of memory elements associated with each row of elementary scanning field areas parallel to the reference line, and temporary storage means connected to the outputs of the adder means for temporarily storing the adder means outputs. The adder means and storage means together form two units, each associated with the memory elements relating to elementary scanning field areas to a respective side of the reference line. The circuit arrangement of the invention further includes summing means connected to the adder means and storage means for causing each unit thereof to periodically produce a weighted output $\Sigma\alpha_i \cdot Z_i$ where $Z_i$ represents the number of occurrences of the one binary value in the memory elements for a given row of scanning field lines and $\alpha_i$ is a weighting value corresponding to the position of that row in the scanning field, at successive instants corresponding to successive positions of the character being investigated relative to the scanning field. The basic arrangement according to the invention additionally includes position indicating means connected to the summing means for producing a correct position signal when the difference between the simultaneously appearing weighted outputs from the two units is less than a predetermined amount.

DESCRIPTION OF THE PREFERRED EMBODIMENTS

Figure 1:
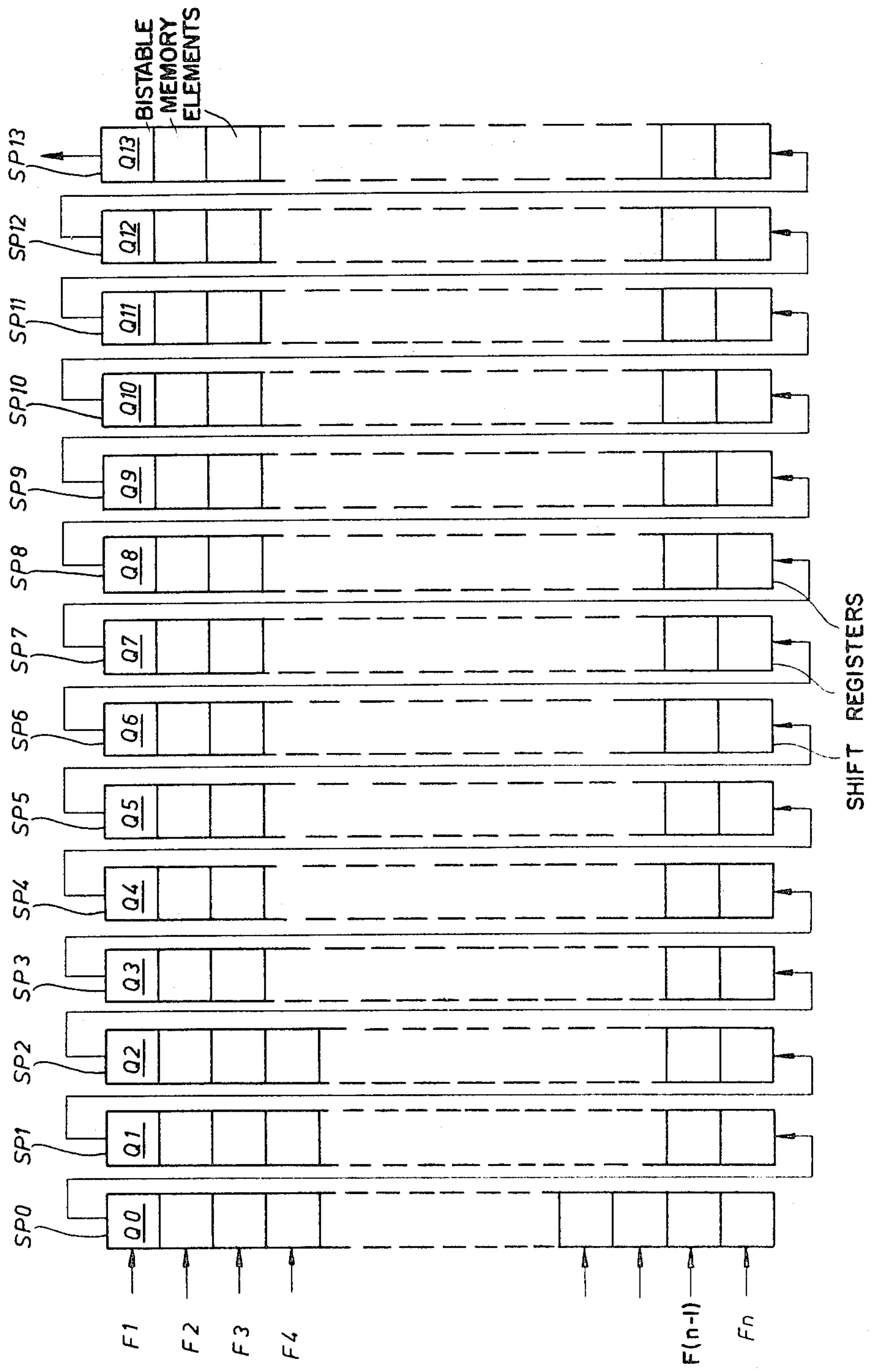
FIG. 1 is a schematic representation of a known memory matrix constructed in the form of a shift register.

FIG. 1 shows a 14-column matrix consisting of bistable memory elements whose columns SP0, SP1, SP2, SP3, SP4, SP5, SP6, SP7, SP8, SP9, SP10, SP11, SP12 and SP13 consist of $n$ elements each. Each column is constructed in the form of a shift register and the registers are connected together so that upon the occurrence of a signal from a shift pulse line (not shown) common to all columns, each memory elements accepts that binary information which was contained in the immediately preceding memory element during the previous timing period, i.e. before the occurrence of the shift signal. Within each matrix column the shifting of information occurs from the bottom to the top, and the uppermost element Q of each matrix column is connected to deliver its stored information to the lowest element of the next column. Because of this mode of connection, the entire matrix can be considered to be a single shift register having $n \times 14$ bit locations. The physical construction of the matrix is not limited to the arrangement shown in the drawing which was selected merely to provide a spatial correspondence with the individual points or elemental areas of the reading field.

The character scanning can be performed by a column of $n$ photodiodes, extending transversely to the direction of movement of the characters and disposed in such a manner that the characters to be read move past it one after another. With this arrangement, the scanning field could be considered to move with the character, i.e. the photodiodes effectively traverse the scanning field associated with each character. Under the control of clock pulses the black-and-white patterns sensed by the photo elements are transferred as binary bits during the passage of a character therepast, e.g. 14 times for each matrix row, and the $n$ signals produced each time are fed via suitable amplifiers having a threshold value behavior and, if required, a special control circuit for generating a reference white value, to the lines F1, F2, F3, F4,...F($n$−1), F$n$ of the associated element of the first matrix column SP0. The shift pulses employed for moving the information within the matrix occur at a rate at least $n$ times as great as the frequency of the scanning by the photocell.

After a shift cycle produced by $n$ shift pulses, the black-and-white binary information which was first fed in parallel into the elements of first column SP0 via lines F1 to F$n$ will be stored in the second matrix column SP1. The information relating to the next succeeding black-and-white pattern sensed by the photo elements is then entered in parallel into column SP0.

In this manner each bit, whose value indicates whether a particular point in the character scanning field is black or white, moves through columns SP1 to SP13 of the memory matrix. After $n$ shift pulses have been applied, the same bit pattern will be found in the matrix, but it will have been moved to the right by one column. This produces the result that, when the parallel data inputs feed information into column SP0, the information stored in the memory matrix is a replica of the character presently in the scanning field and moves on through the matrix in synchronism with the movement of the character.

Figure 2A:
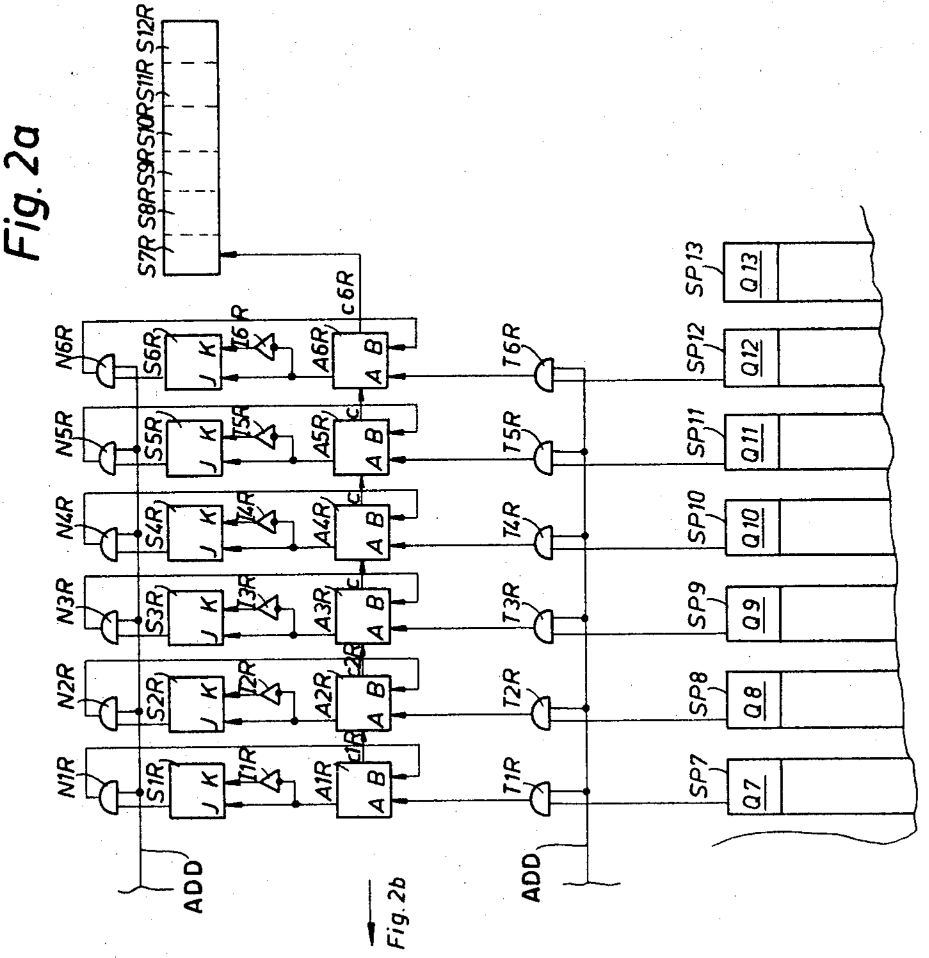
FIGS. 2*a* and 2*b* are two parts of a block diagram of the circuit arrangement according to the present invention.
Figure 2B:
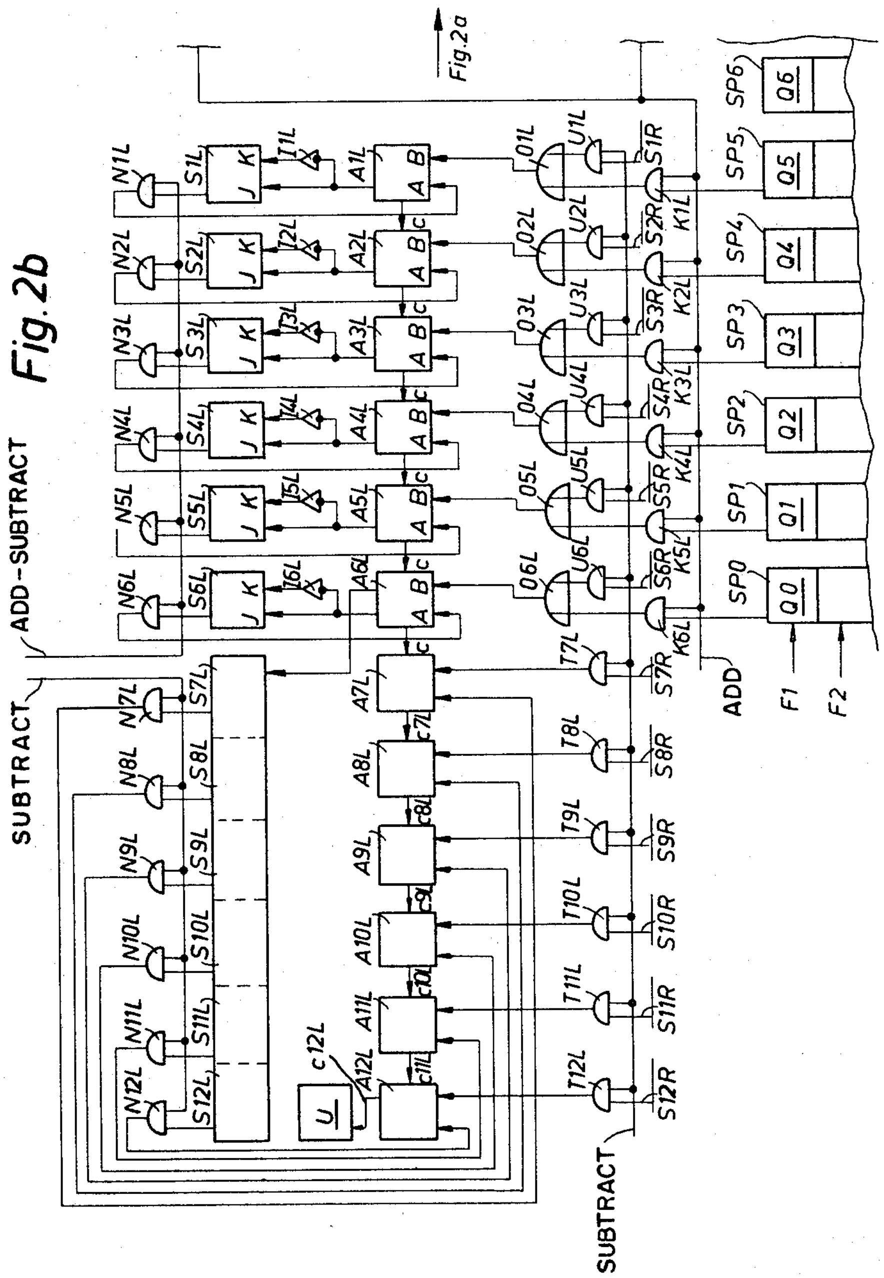

The upper elements Q0 to Q13 of each matrix column, with the exception of columns SP6 and SP13, are connected to logic gates, as shown in FIGS. 2*a* and 2*b*, these being in addition to the connections shown in FIG. 1. The entire matrix is divided into a right half and a left half by an imaginary center axis which in this case runs through column SP6. The matrix elements Q7 to Q12 are connected to the inputs of AND-gates T1R to T6R as shown in FIG. 2*a*, the gates being actuatable by a control line Add. The outputs from these gates are each applied to the A input of a respective full adder A1R to A6R. The outputs of the full adders are each connected with a respective one of the flip-flops S1R to S6R each having inputs J and K and connected to serve as intermediate memory elements in such a manner that the full adder output signal is applied to the J-input of the respective flip-flop and via a respective NOT gate I1R to I6R to the K-input.

The outputs of the intermediate memory elements S1R to S6R are each connected, via respective AND-gates N1R to N6R which are also controlled by the Add line to the other operand input B of the associated full adder A1R to A6R. The CARRY LINE $c$R of adder A1R is applied to the carry input of adder A2R, whose carry line $c$2R is in turn applied to the carry input of the full adder A3R, and so on. In this manner, the contents of the individual full adders, and correspondingly those of the SR flip-flops are provided with weightings which ascend toward the right. The entire arrangement operates as a parallel adder with serial carries so that if the contents of the adder A1R are assumed to be provided with a valuation number, or weight, of $\alpha=1$, the adjacent adders are provided with valuation numbers $\alpha=2$, 4, 8, 16, etc., ascending to the right. The carry line $c$6R of the adder located furthest to the right is applied to the input of a 6-stage binary counter having stages S7R, S8R, S9R, S10R, S11R and S12R. This counter serves to count the carries from stage A6R.

In the operation of the above-described circuit after each shift cycle accompanying the occurrence of $n$ shift pulses, as indicated, the information previously stored in one matrix column has been transferred to the next matrix column to the right. During the shift cycle the contents of all the elements of a matrix column move through the uppermost element Q of this column.

As this occurs, those binary 1's which move through one memory element, e.g. the uppermost one, of each matrix column during one shift cycle are counted. This is accomplished, in the present case, in that during a shift cycle the Add line receives a signal which enables the AND-gates T1R to T6R and gates N1R to N6R in accordance with the shift pulse pattern and thus feeds the consecutively appearing binary 1's to the operand input A of an adder, for example, the 1's from element Q7 are fed to the adder A1R. Each output bit from the adder is stored in the intermediate memory element S1R and added, upon arrival of the next shift pulse, to the binary information then located in Q7.

The carry from each addition is fed to the next adder A2R via line $c$1R. In this way the "binary moment" $\Sigma\alpha_i \cdot Z_i$ of the logic 1's disposed in the right matrix half is brought to the intermediate memory elements, which include the elements of the 6-stage binary counter S7R to S12R, these 1's indicating black areas or points, for example, in the scanning field. The distance $d_i$ of any given 1 from the center axis is here exponentially incorporated in that the weighting values have the form $\alpha_i=2^{d_i-1}\cdot Z_i$ represents the number of 1's located in the $i$–$th$ matrix column from the center axis.

The matrix elements Q5 to Q0 of the left matrix half are connected, as shown in FIG. 2*b*, with full adders A1L to A6L, which in turn are connected to intermediate memory elements S1L to S12L, the last six of which are also constructed as a binary counter. In contradistinction to the previously described matrix half, while the matrix elements Q5 to Q0 are connected to AND-gates K1L to K6L which are controlled by the Add signal, the outputs of these AND-gates each are connected to the input of OR gates O1L to O6L. The outputs of these OR gates are connected to one of the operand inputs (B) of respective adders A1L to A6L. The negated output signals $\overline{S1R}$, $\overline{S2R}$, $\overline{S3R}$, $\overline{S4R}$, $\overline{S5R}$ and $\overline{S6R}$ of the intermediate memory elements of the right matrix half are each applied to one input of a respective further AND-gate U1L to U6L whose other input is controlled by a subtraction signal applied via a Subtract line, as will be further explained below, and whose output is applied to one input of a respective one of the OR gates O1L to O6L.

The subtraction signal also controls a series of AND-gates T7L to T12L whose outputs control further adders A7L to A12L. The negated signals $\overline{S7R}$, $\overline{S8R}$, $\overline{S9R}$, $\overline{S10R}$, $\overline{S11R}$ and $\overline{S12R}$ of the elements of the 6-stage binary counter of the right matrix half are applied to the other inputs of these AND-gates T7L to T12L. The outputs of the stages of the binary counters S7L to S12L are connected to operand inputs of the adders A7L to A12L, respectively, via respective ones of the further AND-gates N7L to N12L which are also controlled by the subtraction signal. The carry line $c$12L of the adder A12L is connected to a carry circuit U.

In contradistinction to the circuit associated with the right matrix half, both the Add and Subtract signals are here applied to the output gates N1L, N2L, N3L, N4L, N5L and N6L of the intermediate memory elements of the circuit associated with the left matrix half.

The signal arriving on the Add line with every shift pulse enables the gates K1L to K6L for transferring the contents of the matrix elements Q5 to Q0. These contents are moved, via gates O1L to O6L to the operand inputs B of the adders A1L to A6L and are added to the existing contents of the intermediate memory stages S1L to S6L. The results of the additions are transferred into the intermediate memory elements S1L to S6L upon the occurrence of a clock pulse signal.

At the end of each shift cycle, a signal is sent over the subtraction line to cause the negated outputs of the intermediate memory stages S1R to S12R to be applied to the B inputs of the adders A1L to A12L.

Simultaneously, the contents of the intermediate memory locations S1L to S12L are applied to the A operand input of each one of the adders A1L to A12L so that, together with the addition step, subtraction of the digital moment of the right matrix half from that of the left matrix half is accomplished. If the moment of the left matrix half is the greater, the adder A12L will emit a carry to the carry circuit U. In the other case, i.e. when the moment of the right matrix half is greater, no carry appears at the above-mentioned point.

The evaluation of the character to be read is to be accomplished precisely at that moment when the digital moments of both matrix halves are as nearly equal as possible. For this purpose it could, for example, be determined whether the result of the moment difference formation which is then contained in the adding network A1L to A12L does not exceed a certain maximum value. A simpler solution, however, is to determine when, during passage of a character through the scanning field from left to right, in which case, of course, the moment of the left matrix half must first be greater, the switch-over occurs to cause the moment of the right matrix half to become greater. It would be possible to locate this changeover with simple means by determining the change in the carry signal $c$12L by interrogating the carry circuit U and to perform the character reading when a change takes place in the above-mentioned direction, i.e. a change from "carry" to "no carry".

In the above-described procedure for determining the correct reading position of a character, the matrix must contain the column SP13 whose upper memory element Q13 is not connected to the above-described circuit since the information must continue to be stored after passing through cell Q12 for purposes of the actual character recognition operation and must under no circumstances be lost. This last column SP13 is thus not used for centering but is used for recognition.

In the manner of deriving the digital moment described above, a valuation of the binary 1's of the various columns was performed in ascending powers of 2. It is, however, also possible to transfer the contents of the adder stages, instead of the carries, from stage to stage, and to add them and thus, for example, to count only the 1's of each matrix half and to compare the values of both halves with each other. It is further possible to form a linear moment in that the column contents are multiplied by a valuation number which is linearly proportional each time to the distance of the column from the center axis.

Although the above-described preferred embodiment of the invention serves to determine the correct reading position in the scanning direction, i.e. in the direction of movement of the characters relative to the photoelements, it should be appreciated that the contents of the appropriately linked matrix elements could also be added row by row, by a circuit arrangement according to the present invention, to determine when the character is centered in the direction perpendicular thereto.

The present invention is furthermore not limited to scanning by one row of sensing elements, in this case a photoline. It can also be used, for example, in conjunction with known flying-spot scanning arrangements and in systems which employ a rectangular array of photoelements to simultaneously scan entire characters and to provide parallel outputs.

It will be understood that the above description of the present invention is susceptible to various modifications, changes and adaptations.

I claim:

1. A circuit arrangement for determining the correct reading position of a character represented by a serial sequence of binary bits in a shift register which is composed of a plurality of sections divided into two substantially equal portions and which receives the whole pattern content of a scanning field containing the character and scanned by sensing means in consecutive scanning sections corresponding to the shift register sections, said arrangement comprising, in combination:

a. a plurality of output gates each connected to a respective shift register section for receiving the binary bits associated with each consecutive scanning section;

b. adder means connected to said gates for summing the number of occurrences of one binary bit value in each section of the shift register, said adder means being divided into two groups each associated with a respective shift register portion;

c. temporary storage means connected to the outputs of said adder means for temporarily storing the adder means outputs and divided into two groups each associated with a respective shift register portion;

d. each group of said adder means forming a respective unit with a respective group of said storage means;

e. summing means connected to said adder means and storage means for causing each unit thereof to periodically produce a weighted output $\Sigma\alpha_i z_i$, where $Z_i$ represents the number of occurrences of the one binary bit value in a section of the shift register and $\alpha_i$ is a weighting value corresponding to the position of that section in the shift register, at successive instants corresponding to successive positions of the character being investigated relative to the scanning field; and f. position indicating and difference determining means connected to said summing means for producing an indication of the difference between the simultaneously appearing weighted outputs from said two units and for producing a correct position signal when such difference is less than a predetermined value.

2. An arrangement as defined in claim 1 wherein said adder means are constituted by a plurality of full adders, each connected to a respective section of the shift register, and said temporary storage means are constituted by a plurality of bistable intermediate memory elements each associated with a respective full adder and each having an input connected to one output of its associated full adder, wherein the output of each said intermediate memory element is connected to the operand input of its associated full adder and the carry output of each full adder is connected to the carry input of the next succeeding full adder.

3. An arrangement as defined in claim 2 wherein said temporary storage means further comprise an additional set of intermediate memory elements for each said unit, with the memory elements of each said set having an input connected to the carry output of the last full adder of its associated unit.

4. An arrangement as defined in claim 3 wherein one said unit further comprises a plurality of further full adders equal in number to the number of intermediate memory elements of said additional set of the other said unit, and said summing means include a plurality of gate elements each connected between the negated output of a respective intermediate memory element of said other unit and an input of a respective full adder or further full adder of said one unit, each said further full adder of said one unit having another input connected to the output of a respective intermediate memory element of said additional set of said one unit, said arrangement further comprising means for enabling each of said gate elements each time the difference between said weighted outputs of said units is to be determined.

5. An arrangement as defined in claim 4 wherein said position indicating means are connected to the carry output of the last one of said further full adders for producing an indication when a change occurs in the signal appearing at said carry output.

6. An arrangement as defined in claim 1 wherein said adder means are connected to less than all of said sections of the shift registers, no connection being made to the last of said sections.